(12) United States Patent
Ucar et al.

(10) Patent No.: US 12,475,574 B2
(45) Date of Patent: Nov. 18, 2025

(54) METHODS AND SYSTEMS FOR A DETECTION OF OBJECTS THAT ARE LIKELY TO FALL FROM VEHICLE CARGO

(71) Applicant: Toyota Motor Engineering & Manufacturing North America, Inc., Plano, TX (US)

(72) Inventors: Seyhan Ucar, Mountain View, CA (US); Emrah Akin Sisbot, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 528 days.

(21) Appl. No.: 17/859,202

(22) Filed: Jul. 7, 2022

(65) Prior Publication Data

US 2024/0013408 A1 Jan. 11, 2024

(51) Int. Cl.
| | |
|---|---|
| *G06T 7/246* | (2017.01) |
| *G06T 7/73* | (2017.01) |
| *G06V 10/75* | (2022.01) |
| *G06V 20/58* | (2022.01) |

(52) U.S. Cl.
CPC .............. *G06T 7/248* (2017.01); *G06T 7/73* (2017.01); *G06V 10/751* (2022.01); *G06V 20/58* (2022.01); *G06T 2207/20081* (2013.01)

(58) Field of Classification Search
CPC ...................... G06T 7/248; G06T 7/73; G06T 2207/20081; G06T 2207/30232; G06V 10/751; G06V 20/58; G06V 2201/08
See application file for complete search history.

(56) References Cited

U.S. PATENT DOCUMENTS

| | | | |
|---|---|---|---|
| 7,010,404 B2 * | 3/2006 | Ichijo | ..................... B66F 9/0755 701/28 |
| 7,219,769 B2 * | 5/2007 | Yamanouchi | .......... G05D 1/667 414/641 |
| 7,688,187 B2 | 3/2010 | Caird et al. | |
| 10,163,219 B2 * | 12/2018 | Carlson | ................ G06V 10/945 |
| 10,207,707 B2 | 2/2019 | Kurata | |
| 11,223,928 B1 | 1/2022 | Wiesenberg et al. | |

(Continued)

FOREIGN PATENT DOCUMENTS

| | | |
|---|---|---|
| CN | 203793211 U | 8/2014 |
| DE | 102013101880 A1 | 8/2014 |

(Continued)

*Primary Examiner* — Samir A Ahmed
(74) *Attorney, Agent, or Firm* — Dinsmore & Shohl LLP

(57) ABSTRACT

A method for detecting objects that are likely to fall from vehicle cargo includes obtaining first data of a cargo of a first vehicle captured at a first time and second data of the cargo captured by a second vehicle in an environment of the first vehicle at a second time after the first time, determining a first distance between two key points of the first data or a first shape constructed by key points of the first data and a second distance between two key points of the second data or a second shape constructed by key points of the second data, and detecting a movement of the cargo based on a comparison of the first distance and the second distance or a comparison of the first shape and the second shape.

18 Claims, 4 Drawing Sheets

(56) References Cited

U.S. PATENT DOCUMENTS

| | | | |
|---|---|---|---|
| 2009/0189783 A1* | 7/2009 | Koitabashi | G06T 7/579 |
| | | | 340/937 |
| 2019/0182457 A1* | 6/2019 | Kanaoka | B60R 25/102 |
| 2019/0278279 A1 | 9/2019 | Hase et al. | |
| 2020/0198574 A1* | 6/2020 | Tsutsui | B60R 22/34 |
| 2021/0056322 A1 | 2/2021 | Hasegawa et al. | |
| 2021/0114505 A1 | 4/2021 | Petrucci et al. | |
| 2021/0383318 A1 | 12/2021 | Patnaik et al. | |

FOREIGN PATENT DOCUMENTS

| | | |
|---|---|---|
| DE | 102015221973 A1 | 5/2017 |
| EP | 3800440 A1 | 4/2021 |
| KR | 102243493 B1 | 4/2021 |

\* cited by examiner

METHODS AND SYSTEMS FOR A DETECTION OF OBJECTS THAT ARE LIKELY TO FALL FROM VEHICLE CARGO

TECHNICAL FIELD

The present disclosure relates to systems and methods for detecting objects, and more particularly, to methods and systems for a detection of objects that are likely to fall from vehicle cargo.

BACKGROUND

There has been an increased rate of accidents caused by fallen objects. There is a possibility that fallen objects lead to accidents resulting in human causalities and fatalities. Such accidents may be preventable via early detection of objects that are likely to fall.

Therefore, there is a need for methods and systems for comparing images efficiently and detecting whether the cargo is properly secured are desired.

SUMMARY

According to one embodiment of the present disclosure, a method may include obtaining first data of a cargo of a first vehicle captured at a first time and second data of the cargo captured by a second vehicle in an environment of the first vehicle at a second time after the first time, and determining a first distance between two key points of the first data or a first shape constructed by key points of the first data and a second distance between two key points of the second data or a second shape constructed by key points of the second data, and detecting a movement of the cargo based on a comparison of the first distance and the second distance or a comparison of the first shape and the second shape.

According to another embodiment of the present disclosure, a processor is programmed to obtain first data of a cargo of a first vehicle captured at a first time and second data of the cargo captured by a second vehicle in an environment of the first vehicle at a second time after the first time, and determine a first distance between two key points of the first data or a first shape constructed by key points of the first data and a second distance between two key points of the second data or a second shape constructed by key points of the second data, and detect a movement of the cargo based on a comparison of the first distance and the second distance or a comparison of the first shape and the second shape.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Cargo loaded on a vehicle may move due to vibrations and translation of the vehicle during operation of the vehicle. Once cargo begins to move, there is a possibility that the cargo may fall onto a road. This fallen cargo may cause traffic jams, accidents, injuries and/or fatalities to other vehicles or pedestrians.

Figure 1:
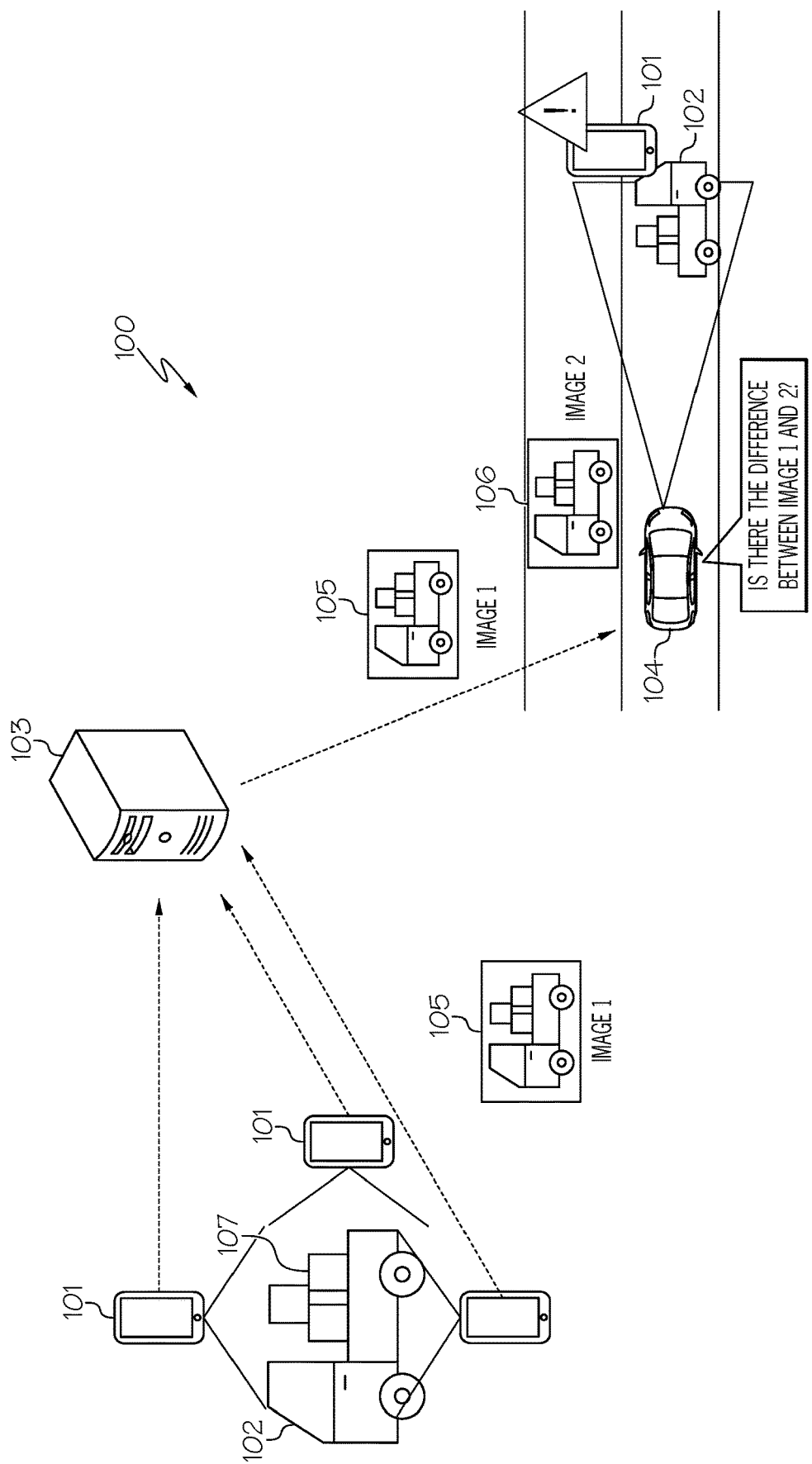
FIG. 1 depicts an example system for detecting cargo in a vehicle, according to one or more embodiments shown and described herein.

Referring now to FIG. 1, an example system 100 for detecting cargo in a vehicle is depicted, according to some embodiments. The system 100 may include a mobile device 101, a vehicle 102, a server 103, connected vehicles 104, a first image 105, a second image 106, and cargo 107. The first image 105 may be taken by the mobile device 101 or by connected vehicle 104 in a vicinity of the vehicle 102. In some embodiments, the first image 105 may be captured by a camera attached to other entities, such as security cameras, road side units, and the like. The first image 105 may be indicative of a first position of the cargo 107 in the vehicle 102. The first image 105 may be taken prior to travel (e.g., taken by the driver of the vehicle 102) or may be taken during operation of the vehicle 102 (e.g., by connected vehicle 104). Further, the first image 105 may include one or more photos of the cargo 107 taken at various angles. For example, the first image 105 may include the left side view and right side view of the cargo 107 in addition to the rear view of the cargo 107. In this way, a more complete environment of the cargo 107 may be shown within the vehicle 102.

In some embodiments, the system 100 may utilize V2V communications, in which case the server 103 may not be necessary. For example, the vehicle 102 may transmit the first image 105 to the connected vehicle 104 without the server 103 being involved. In other embodiments, the system 100 may utilize V2X communication, in which case the server 103 is communicatively coupled with the vehicle 102 and the connected vehicles 104. In other embodiments, the system 100 may utilize some combination of V2V, V2X, or other forms of communications (For example, Bluetooth, Near-Field Communications), in which case the server 103 may assist the vehicle 102 and the connected vehicle 104 in coordinating with one another.

The server 103 may be a computing device that may be positioned remotely from any roads and/or vehicles. The server 103 may be a moving server, such as another vehicle, a cloud-based server, or any other type of computing device. As illustrated, the server 103 is a cloud-based server. The server 103 may be communicatively coupled to the connected vehicles 104 and the mobile device 101 via wireless connectivity. In some embodiments, the server 103 may be a local server including, but not limited to, a roadside unit, an edge server, and the like.

Each of the connected vehicle 104 and the vehicles 102 may be a vehicle including an automobile or any other passenger or non-passenger vehicle such as, for example, a terrestrial, aquatic, and/or airborne vehicle. In some embodiments, one or more of the connected vehicles 104 may be an unmanned aerial vehicle (UAV), commonly known as a drone. The connected vehicles 104 may have optical cameras (e.g., such as a front camera). Moreover, instead of connected vehicles 104, the first image 105 may be captured by a surveillance camera attached to a utility pole, within a tunnel, or along a highway. Additionally, the first image 105 may be captured by a camera used during truck weigh-ins along a road.

The connected vehicles 104 are vehicles that may contain one or more driving assist components (e.g., autonomous driving, CACC, etc.) and one or more radios to communicate with other vehicles and/or infrastructure. Connected vehicles 104 may establish wireless connectivity with the server 103 and/or with other connected vehicles 104. Non-connected vehicles may not have functionalities of communicating with the server 103 or other vehicles. The vehicles 102 and 104 may be unrelated to each other. That is, the owners and/or drivers of the vehicles 102 and 104 need not know each other or plan ahead to initiate communication.

The second image 106 may be taken by the connected vehicle 104 in the vicinity of the vehicle 102. The second image 106 may be indicative of a second position of the cargo 107 in the vehicle 102. The second image 106 may be taken during operation of the vehicle 102 (e.g., by connected vehicle 104). Further, the second image 106 may include one or more photos of the cargo 107 taken at various angles. In this way, a more complete environment of the cargo 107 may be shown within the vehicle 102. In embodiments, a plurality of connected vehicles 104 cooperate to provide varying images of the cargo. For example, a first connected vehicle may capture an image of the cargo at a first angle and a second connected vehicle may capture an image of the cargo at second first angle. In this way, the connected vehicles 104 in the vicinity of the vehicle 102 collaborate to capture the second position of the cargo 107.

As discussed in greater detail herein, the system 100 may compare the first image 105 with the second image 106. In doing so, the system 100 may determine if the cargo 107 is susceptible to falling off the vehicle 102. If the system 100 determines the cargo 107 may fall off the vehicle 102, the vehicle 102 may be alerted to pull over the vehicle 102 and to secure the cargo 107. The alert may be provided to the mobile device 101 or to the infotainment system of the vehicle 102.

Figure 2:
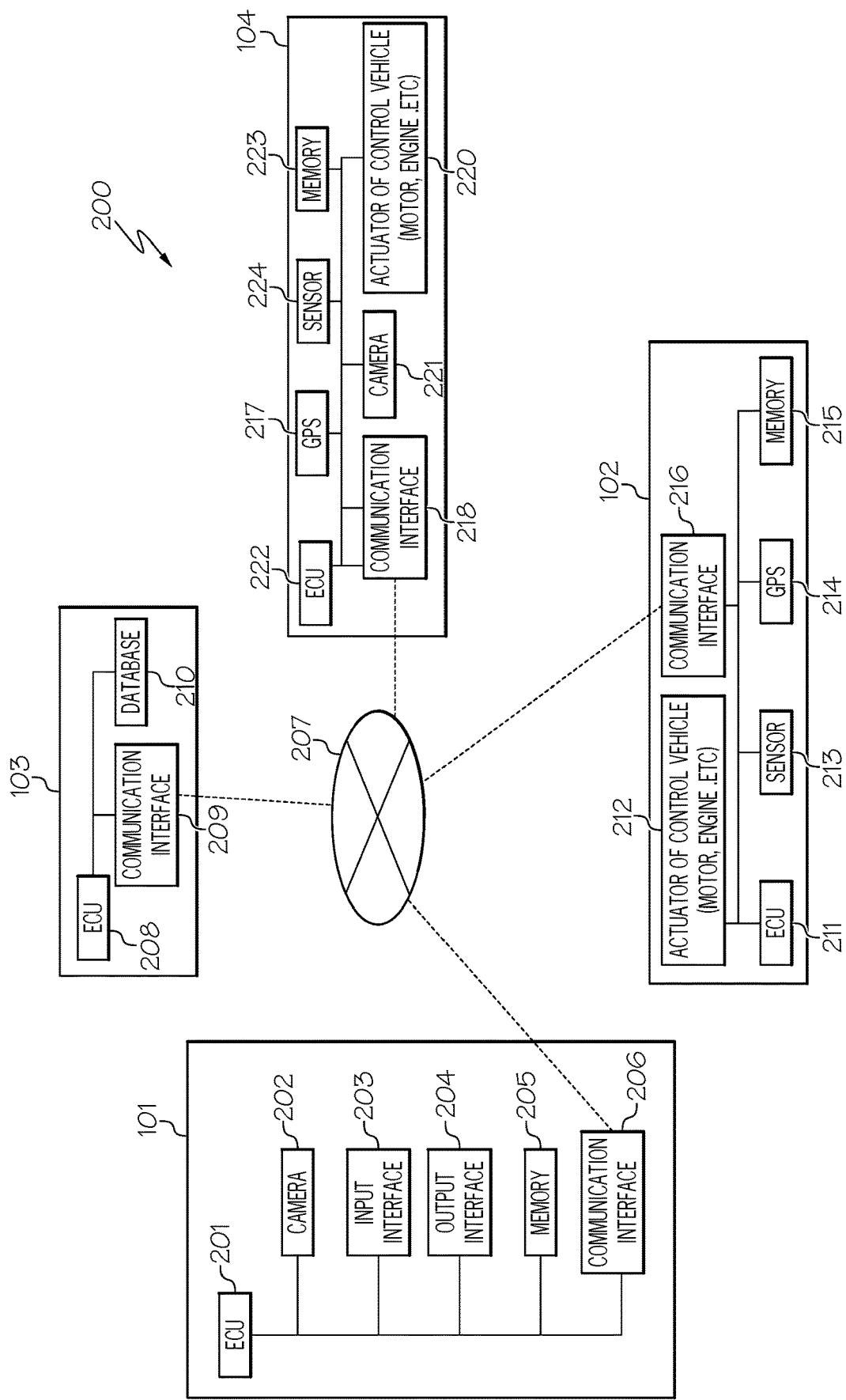
FIG. 2 depicts a schematic diagram of an example system for detecting cargo in a vehicle, according to one or more embodiments shown and described herein.

Referring now to FIG. 2, a schematic diagram of an example system 100 is depicted. In particular, the system 100 may include the mobile device 101, the vehicle 102 having cargo 107, the server 103, and connected vehicles 104. The mobile device 101, the vehicle 102, the server 103, and the connected vehicles 104 may be connected via a network 207.

The mobile device 101 may include an electronic control unit (ECU) 201, a camera 202, an input interface 203, an output interface 204, a memory 205, and a communication interface 206. The ECU 201, the camera 202, the input interface 203, the output interface 204, the memory 205, and the communication interface 206 are connected by a communication path. When instructed to take an image via the input interface 203, the camera 202 is activated and the image taken is stored in the memory 205. The image may be sent to the server 103 via the communication interface 206. The image is displayed on the output interface 204. These actions are controlled by the command of the ECU 201. In embodiments, the operation of taking the image is completed by connected vehicles 104.

The ECU 201 may be any device capable of executing machine readable and executable instructions. Accordingly, the ECU 201 may be a controller, an integrated circuit, a microchip, a computer, or any other computing device. The ECU 201 coupled to a communication path that provides signal interconnectivity between various modules of the system. As used herein, the term "communicatively coupled" means that coupled components are capable of exchanging data signals with one another such as, for example, electrical signals via conductive medium, electromagnetic signals via air, optical signals via optical waveguides, and the like.

The camera 202 may be any imaging sensors configured to operate in the visual and/or infrared spectrum to sense visual and/or infrared light. The input interface 203 may be a touch screen, keyboards, or any other input device configured to receive inputs from a user. The output interface 204 may be a screen configured to display an image, or a speaker configured to output audio.

The memory 205 may contain one or more memory modules comprising RAM, ROM, flash memories, hard drives, or any device capable of storing machine-readable and executable instructions such that the machine-readable and executable instructions can be accessed by the ECU 201. The communication interface 206 may be a network interface that includes hardware for communicatively coupling the mobile device 101 to other entities.

The vehicle 102 may include ECU 211, actuators 212, sensors 213, a communication interface 216, GPS 214, and a memory 215. The ECU 211, the actuators 212, the sensors 213, the communication interface 216, the GPS 214, and the memory 215 are connected by a communication path.

The ECU 211 may be any device capable of executing machine readable and executable instructions. Accordingly, the ECU 211 may be a controller, an integrated circuit, a microchip, a computer, or any other computing device. The ECU 211 coupled to a communication path that provides signal interconnectivity between various modules of the system. As used herein, the term "communicatively coupled" means that coupled components are capable of exchanging data signals with one another such as, for example, electrical signals via conductive medium, electromagnetic signals via air, optical signals via optical waveguides, and the like.

The actuators 212 may be any powertrain configured to operate the vehicle 102. For example, the actuators 212 may include an engine, a motor, or the like.

The sensors 213 may be any device having an array of sensing devices capable of detecting radiation in an ultraviolet wavelength band, a visible light wavelength band, or an infrared wavelength band. The sensors 213 may detect the presence of other vehicles such as the connected vehicle 104 in FIG. 1.

The GPS 214 may be a satellite antenna configured to receive signals from global positioning system satellites. Specifically, in one embodiment, the GPS 214 includes one or more conductive elements that interact with electromagnetic signals transmitted by global positioning system satellites. The received signal is transformed into a data signal indicative of the location (e.g., latitude and longitude) of the GPS 214 or an object positioned near the GPS 214, by the ECU 211.

The communication interface 216 includes hardware for communicatively coupling the vehicle 102 to other entities. The communication interface 216 can be any device capable of transmitting and/or receiving data via a network 207 or other communication mechanisms. Accordingly, the communication interface 216 can include a communication transceiver for sending and/or receiving any wired or wireless communication. For example, the hardware of the communication interface 216 may include an antenna, a modem, a LAN port, a Wi-Fi card, a WiMAX card, a cellular modem, near-field communication hardware, satellite communication hardware, and/or any other wired or wireless hardware for communicating with other networks and/or devices. The vehicle 102 may connect with one or more other connected vehicles and/or external processing devices (e.g., the server 103) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

The network 207 may include one or more computer networks (e.g., a personal area network, a local area network, or a wide area network), cellular networks, satellite networks and/or a global positioning system and combinations thereof. Accordingly, the ego vehicle system 200 can be communicatively coupled to the network 207 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Based on information obtained by the sensors 213 or the GPS 214 or parameters stored in the memory 215, the ECU 211 may perform various calculations. Using the result of the various calculations, the ECU 211 controls the actuators 212. For example, in response to detecting a shift in the location of the cargo, the actuators 212 may provide a signal to the vehicle 102 to pull the vehicle to a side of the road (e.g., when the vehicle is autonomously controlled) or to provide a signal to the mobile device 101 or an infotainment system of the vehicle 102 to pull the vehicle 102 to the side of the road. Moreover the information obtained by the sensors 213 or GPS 214 may be provided to the server 103 via the communication interface 216.

The server 103 may include ECU 208, a communication interface 209, and a database 210. The ECU 208 and the communication interface 209 may be similar in features to the ECU 211 and the communication interface 216, respectively. The database 210 may be stored in the memory of the server 103. The server 103 receives various information from the mobile device 101, the vehicle 102, and the connected vehicles 104. After receiving the various information, the various information may be stored in the database 210. Moreover, based on the information in the database 210, the ECU 208 may perform various calculation. As discussed in greater detail herein, the various calculations may include detecting a movement of the cargo in the vehicle 102 and a pose difference of the cargo in the vehicle 102. The result of these various calculation may be sent to the mobile device 101, the vehicle 102, or the connected vehicles 104 via the communication interface 209. This is advantageous for off-load processing of comparing the first image 105 and the second image 106 by the server 103 rather than by the vehicle 102 and/or the connected vehicles 104.

In embodiments, the operations of the server 103 may be locally performed within the vehicle 102 and/or within the connected vehicles 104. This may be advantageous so that local networks (e.g., NFC communications, V2V communications) may be utilized to communicate between the vehicle 102 and the connected vehicles 104.

The connected vehicles 104 may include ECU 222, actuators 220, sensors 224, a communication interface 218, camera 221, GPS 217, and a memory 223. The ECU 222, the actuators 220, the sensors 224, the communication interface 218, camera 221, the GPS 217, and the memory 223 may be connected by a communication path. The ECU 222, the actuators 220, the sensors 224, the communication interface 218, the GPS 217, the memory 223 may be similar in features to the ECU 211, the actuators 212, the sensors 213, the communication interface 216, the GPS 214, the memory 215, respectively.

The sensors 213 may be any device having an array of sensing devices capable of detecting radiation in an ultraviolet wavelength band, a visible light wavelength band, or an infrared wavelength band. The sensors 213 may detect the presence of other vehicles such as the connected vehicle 102 in FIG. 1. The sensors 213 may have any resolution. In some embodiments, one or more optical components, such as a mirror, fish-eye lens, or any other type of lens may be optically coupled to the sensors 213. In some embodiments, the sensors 213 may also provide navigation support. That is, data captured by the sensors 213 may be used to autonomously or semi-autonomously navigate the vehicle 104.

In some embodiments, the sensors 213 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar sensors may be used to obtain a rough depth and speed information for the view of the vehicle 104.

Based on information obtained by the sensors 224 or GPS 217 such as images of other vehicles, current locations of the vehicle 104 and other vehicles, or parameters stored in the memory 223, the ECU 222 performs various calculation. Using the result of these various calculation, the ECU 222 controls the actuators 220. For example, the ECU 222 may provide a signal to the camera 221 to capture images of the vehicle 102 on a specified frequency to monitor the position of the cargo 107. In embodiments, where the connected vehicle 102 is autonomously operated, the ECU 222 provides a signal to the actuators 220 to position the connected vehicle 104 at a different angle in order to take additional photos of the cargo 107. In embodiments where the connected vehicle 104 is manually controlled, the ECU 222 provides a signal to a mobile device or to an infotainment system of the connected vehicles 104 to position the connected vehicle 104 at a different angle in order to take additional photos of the cargo 107. This may be advantageous where the vehicle 102 and the connected vehicles 104 operate in a fleet and monitor cargo systematically.

Moreover, the information obtained by the sensors 224 or GPS 217 may be sent to the server 103 via the communication interface 218. The camera 221 is controlled by the ECU 222 based on the provided information or by an instruction from another device (the server 103, the mobile device 101, etc.).

The memory 205, 215, 223, or database 210 may contain one or more memory modules including RAM, ROM, flash memories, hard drives, or any device capable of storing machine readable and executable instructions such that the machine readable and executable instructions can be accessed by the ECU 201, 208, 211, 222. The machine readable and executable instructions may include logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory 205, 215, 223, or database 210. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Figure 3:
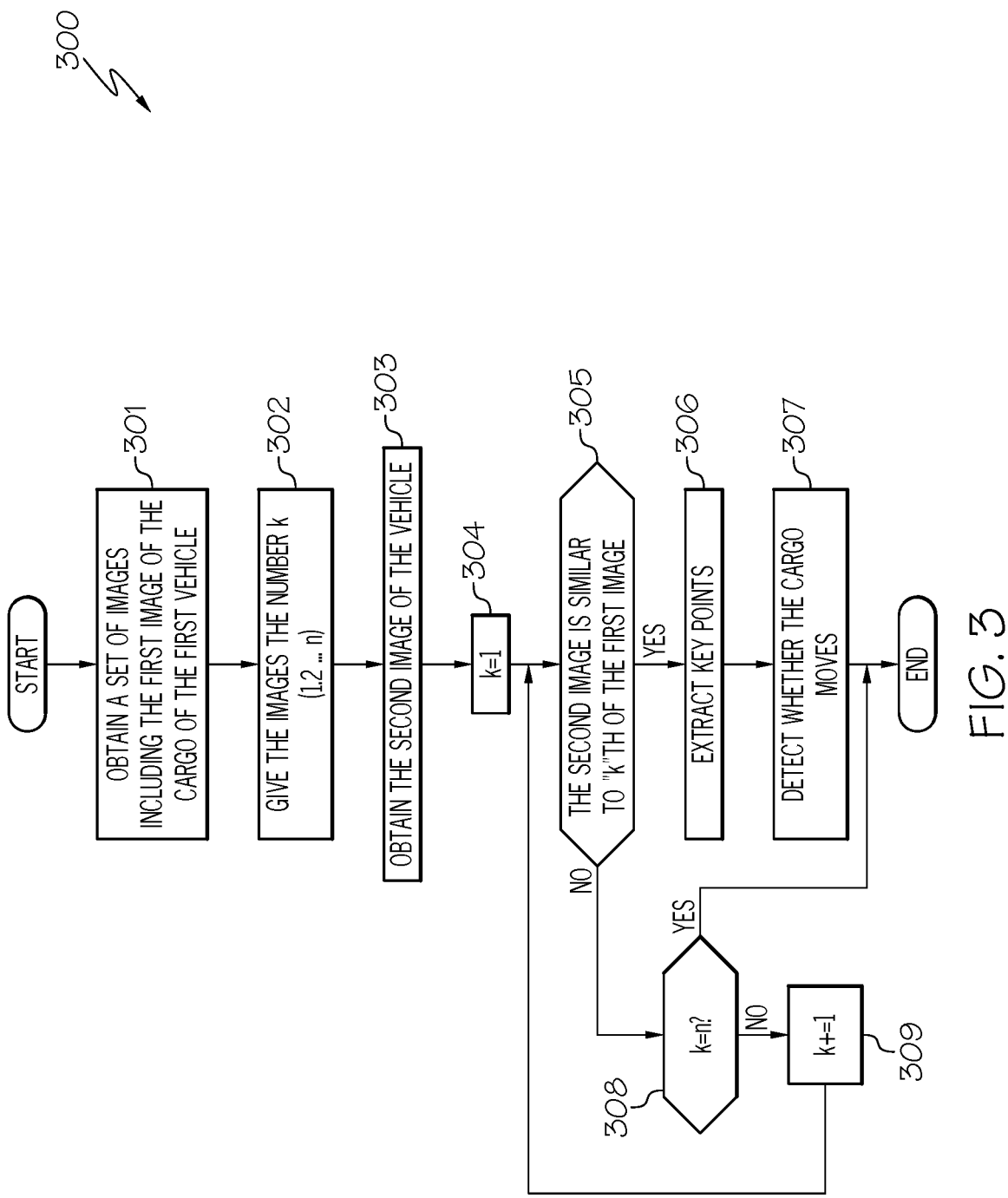
FIG. 3 depicts a flowchart of an example method for detecting cargo in a vehicle, according to one or more embodiments shown and described herein.

Referring now to FIG. 3, a flowchart 300 of an example method detecting whether cargo in a vehicle moves is depicted, according to embodiments. The flowchart 300 may be conducted by at least one of the ECU 201, 208, 211, or 222. At step 301, a set of images including the first images of the cargo of the vehicle 102 is obtained. As discussed in greater detail above, there are various ways about how to obtain the images. In a typical manner, a driver of the vehicle 102 obtains images by using the mobile device 101 before operating the vehicle. In another way, the first image may be obtained by a surveillance camera attached to a utility pole or along highway. Moreover, it is possible for other vehicles in the vicinity of the first vehicle to capture the first image.

The flowchart 300 may include step 302, where the images are assigned a number. For example, if the number of the images is n, the images are assigned 1, 2 . . . n in order. There are various ways about how to assign a number. For example, instead of assigning 1, 2 . . . n, even numbers and odd numbers may be assigned. Moreover, it does not have to be a number. For example, unique parameters may be associated, resulting in that each image may be distinguishable from each other (e.g., a, b, c). In some embodiments, the present system may assign a pseudo-ID to the vehicle 102 in association with contextual features, such as a color, a type of the vehicle, and the location of the vehicle. For example, the mobile device 101 generates the pseudo-ID for the vehicle 102 and transmits the pseudo-ID to the server 103 or other connected vehicles. In this regard, the present system can track the vehicle 102 and capture images of the vehicle 102.

In embodiments, a single image is taken to reflect a first position of the cargo and may be defined a first image. In embodiments, a plurality of images are taken to reflect the first position of the cargo. These images may be automatically combined (e.g., stitched together) using machine learning or artificial intelligence to define the first image. In other embodiments, the plurality of images remain separate and together define the first image.

At step 303, the second image of the cargo of the vehicle 102 is obtained. The time when the second image is captured is after the time when the first image is captured. In a first example, the second image is captured by the connected vehicle 104. However, as discussed in greater detail above, there are various methods about how to obtain the second image. For example, the second image may be captured via a surveillance camera attached to a utility pole or positioned along the highway. Which connected vehicles or the surveillance camera that are used may be determined based on a positional information of the vehicle 102, and the positional information of the connected vehicles 104 or the surveillance camera. For example, if the server 103 has positional information for the vehicle 102 (e.g., via GPS) and the connected vehicles 104 or the surveillance camera in database 210, the ECU 208 of the server 103 may identify the connected vehicles 104 or the surveillance camera in proximity to the vehicle 102. If positional information is not available, the server 103 may instead utilize V2V or V2X between the vehicle 102 and the connected vehicles 104 and/or the surveillance cameras to determine what is in proximity to the vehicle 102. In another example, a person instructs the connected vehicles 104 or the surveillance camera to capture images directly by using the mobile device 101. In some embodiments, the second image of the cargo of the vehicle 102 may be obtained by a vehicle other than the connected vehicles 104. For example, the server 103 may reroute another vehicle that has necessary sensors such as a camera or a LIDAR sensor to move closer to the vehicle 102. Then, another vehicle may meet the vehicle 102 and capture the second image of the cargo of the vehicle 102.

At step 304, a parameter k is set to 1. At step 305, whether the second image is similar or same to "k"th of the first image or not may be checked. The criteria whether the second image is similar or same to "k"th of the first image or not may be based on whether or not the angle in which the images were taken correspond. More specifically, the degree of matching of the angles of the vehicle 102 in the image is checked. The check may be done by a person or by artificial intelligence. Examples of artificial intelligence are neural networks and support vector machines. If the second image is similar or same to "k"th of the first image, then the process proceeds to step 306.

In some embodiments, if the first image exactly matches with the second image, the system does not proceed with pose estimation to extract key points from the first image 105 and the second image 106. That is, if the first image exactly matches with the second image, the system determines that the cargo did not move, and no further analysis is needed. This is advantageous for reducing processing resources.

Figure 4A:
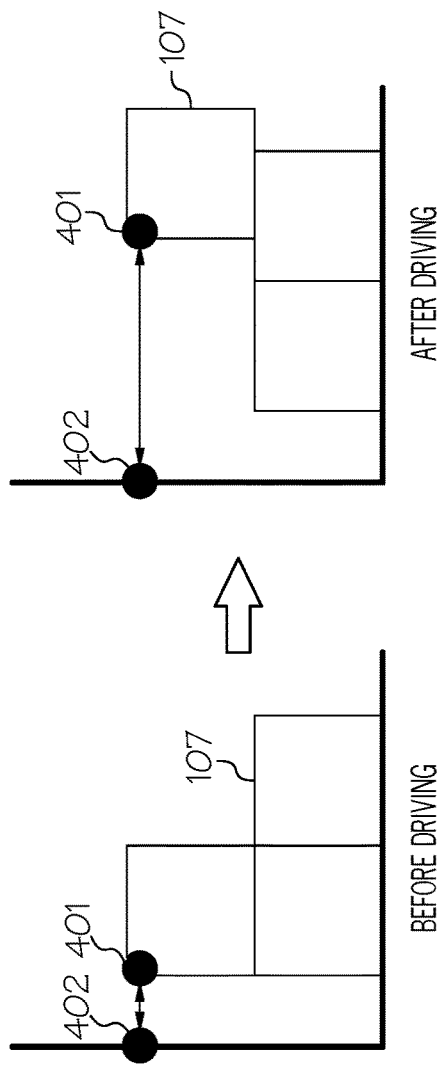
FIGS. 4A-4C depict a cargo condition of a vehicle, according to one or more embodiments shown and described herein.
Figure 4C:
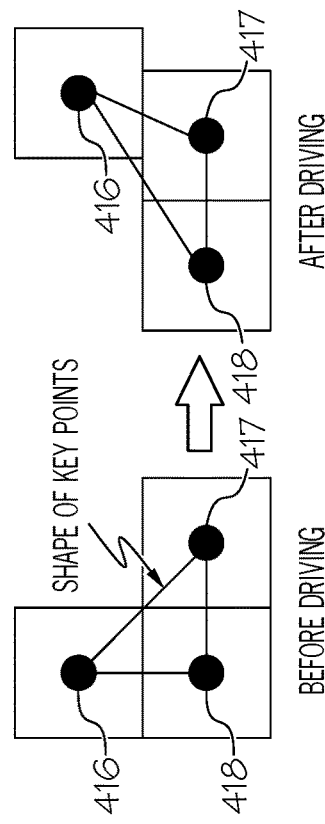
Figure 4B:
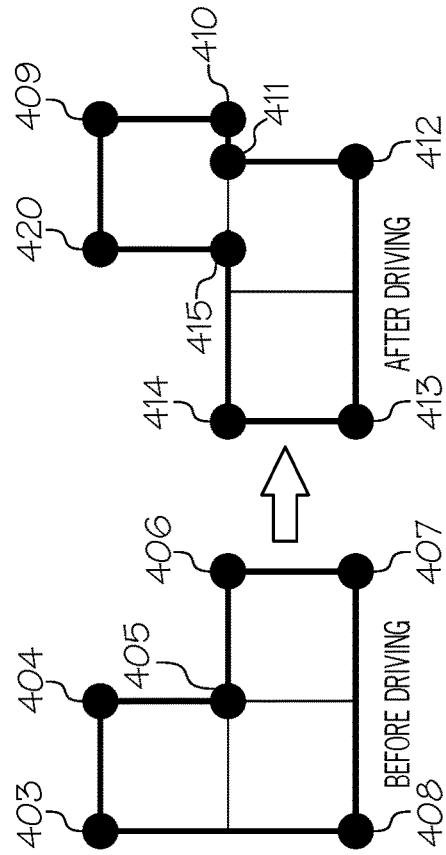

At step 306, key points are extracted from the first image 105 and the second image 106. For example, key points are extracted based on pose estimation of the first image 105 and the second image 106. As discussed in greater detail below, the key points 401 . . . 418 are depicted in FIGS. 4A-4C. In FIGS. 4A-4C, the image before driving corresponds to the first image 105, and the image after driving corresponds to the second image 106.

At step 307, whether or not the cargo has moved is detected. There are various ways about how to detect this movement. As discussed in greater detail below, the approaches discussed in FIGS. 4A-4C disclose varying methods of detecting if the cargo in the vehicle has moved. These methods include, but are not limited to (1) designating key points on the cargo and then determining a difference of the key points relative to a predetermined value, (2) constructing a shape of the cargo based on key points along edges of the cargo and comparing a difference in the shape of the cargo, and (3) constructing a shape of the cargo based on key points in a center of each element of the cargo (e.g., a box, a container) and comparing a difference in the shape of the cargo. In some embodiments, time-series analysis may be used to detect the movement of the cargo. The system captures images of the cargo of the vehicle 102 and accumulates them over time. The system then checks how the deviation of the captured images changes over time. The images of the cargo accumulated over time are compared with each other, and the deviation is computed. If the cargo of the vehicle 102 is not moving, then the deviation may be zero. If the cargo of the vehicle 102 is moving over time, then the deviation tends to increase. The system can inform the driver of vehicle 102 or other vehicles when the deviation exceeds a predefined threshold.

If the second image is not similar or same to "k"th of the first image, then the process moves to step 308. At step 308, Whether or not k is n is detected. If k is n, then the process is completed. In this case, the second image is not similar or the same to the first image. As a result, steps 306 and 307 are not performed. In this way, unnecessary operations may be omitted, resulting in a more efficient process.

At step 308, whether or not k is n is detected. If k is n, then the process moves to step 309. At step 309, the value of k is incremented by 1, and the process proceeds to step 305. As a result, the images are checked in sequence until a similar or same image is found. If not found, the process may end at step 308. After the end step, the second image 106 may be deleted. In embodiments, the second image 106 may be saved as the first image, and may then be used as the first image when re-performing the method of FIG. 3.

If it is detected that the cargo 107 has moved at step 307, there are various ways this may be conveyed to the driver of the vehicle. For example, if is detected that the cargo 107 has moved, this information is conveyed as an alert to the driver of the vehicle 102 via the mobile device 101. In embodiments, instead of the mobile device 101, the information that the cargo 107 has moved is conveyed to the driver of the vehicle 102 via a human-machine interface (e.g., an infotainment system of the vehicle), which is installed in the vehicle 102. After the driver receives this information, the driver can adjust the cargo 107.

In another example, the information may be conveyed to an administrator who manages the vehicle 102. Moreover, the information may also be conveyed to road service companies or the police. The administrator, road service companies, or police can adjust the cargo 107. In some embodiments, the vehicle 102 may be an autonomous vehicle and the information may be conveyed to the remote operator of the vehicle 102. Then, in response to receiving the information, the remoter operator may take care of parking the vehicle 102 in an appropriate place.

In another example, the server 103 may guide the vehicle 102 along the road in response to detecting the cargo has moved. In some embodiments, where the vehicle 102 is autonomously operated, the vehicle 102 may be controlled directly by the server 103 to a side of the road or to a designated safe area. In embodiments, where the vehicle 102 is manually operated by the driver, the server 103 may alert the driver, via the mobile device 101 or an infotainment system of the vehicle 102 to pull the vehicle to the side of the road or provide information as to where to park the vehicle. While the above description describes images captured by cameras, other data such as data captured by other sensors, such as LIDAR sensors, RADAR sensors, sonar sensors may be used to detect movement of the cargo of the vehicle 102.

Referring now to FIGS. 4A-4C, a cargo condition of a vehicle is shown, according to varying embodiments. FIGS. 4A-4C detail varying methods of determining key points within and/or along the cargo. The key points are used to determine a position and/or shape of the cargo. The key points may be designated based on pose estimation, computer vision, AI, and any other suitable approach for designating key points. In FIGS. 4A-4C, images before and after driving are used, but it is not necessary to use images before and after driving. Instead of an image before driving, an image while operating may be first used. In this way, an operator of the vehicle may detect a cargo status within the vehicle in real time.

Further, each of the key points are used to determine a pose of the cargo. The pose of the cargo is determined via a pose estimation that may be performed by any of ECU 201, 208, 211, or 222. The pose estimation facilitates for the system to perform a picture matching between the first image and the second image. The pose estimation may be performed by comparing key points of the cargo. In embodiments, if the initial pose estimation is completed, and the change in the distance between two points or the shape of the cargo has not surpassed a predetermined value, the analysis is not performed. This is advantageous for reducing processing resources. Any suitable pose estimation may be used for determining the pose of the cargo.

In FIG. 4A, a key point 401 is located in a corner of the cargo 107 and a key point 402 is located on the vehicle 102. In FIG. 4A, whether or not the distance between key points 401 and 402 has changed is detected. More specifically, it is checked whether the difference between the distance between key point 401 and 402 before driving and the distance between key point 401 and 402 after driving is equal to or greater than a predetermined value. If the difference is equal to or greater than the predetermined value, it is determined that the cargo 107 has moved. If the difference is not equal to or greater than the predetermined value, it is determined that the cargo 107 has not moved. The predetermined value may be set by a driver or by the server 103. In some embodiments, the predetermined value may be determined based on the dimension of the cargo or shape of the cargo.

In FIG. 4B, key points 403, 404, 405, 406, 407, 408, 409, 410, 411, 412, 413, 414, 415, 420 are located along an outline of the cargo 107. The system may check whether the difference between the shape constructed by key points 403, 404, 405, 406, 407, 408 before driving and the shape constructed by key points 408, 409, 410, 411, 412, 413, 414, 415, 420 after driving is equal or not. The check may be done by a person or by artificial intelligence (AI).

In FIG. 4C, key points 416, 417, 418 are located in a center of the each element of the cargo 107. The shape may be constructed by key points 416, 417, 418, each being located in a center of each element of the cargo 107.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
obtaining a set of data including first data of a cargo of a first vehicle captured at a first time, wherein each of the set of data represents a view of the cargo taken at different times;
obtaining second data of the cargo captured by a second vehicle in an environment of the first vehicle at a second time after the first time;
determining whether an angle from which the second data was obtained corresponds to an angle from which the first data was obtained; and
when it is determined that the angle from which the second data was obtained corresponds to the angle from which the first data was obtained:
determining a first distance between two key points of the first data,
determining a second distance between two key points of the second data, and
detecting a movement of the cargo when a deviation between the first distance and the second distance exceeds a predetermined threshold,
wherein the key points of the first data and the key points of the second data comprise points on at least one of the first vehicle and the cargo, and
wherein the set of data, the first data, and the second data each comprise at least one of image data captured by a camera and point data captured by at least one of a LIDAR sensor, radar sensor, and/or sonar sensor.

2. The method according to claim 1, further comprising:
transmitting a signal related to an alert based on the detection of the movement of the cargo.

3. The method according to claim 1, further comprising:
implementing pose estimation on the first data to obtain the two key points of the first data; and
implementing pose estimation on the second data to obtain the two key points of the second data.

4. The method according to claim 1, further comprising:
in response to determining that the second data do not correspond to the first data of the set of data:
identifying from the set of data third data that corresponds to the second data;
determining a third distance between two key points of the third data; and
detecting the movement of the cargo based on a comparison of the third distance and the second distance,
wherein the third data comprises at least one of image data captured by camera and point data captured by at least one of a LIDAR sensor, radar sensor, and/or sonar sensor.

5. The method according to claim 1, wherein:
the first time is before the first vehicle starts to drive with the cargo.

6. The method according to claim 1, wherein:
the second time is after the first vehicle starts to drive with the cargo.

7. The method according to claim 1, wherein:
the key points include one or more points corresponding to a contour of the cargo.

8. The method according to claim 1, wherein:
calculating the deviation is conducted using a machine learning model.

9. The method according to claim 1, wherein:
the first data is received from a device proximate to the first vehicle.

10. The method according to claim 1, further comprising transmitting a signal related to an alert to the first vehicle, wherein the signal instructs the first vehicle to output the alert.

11. The method according to claim 10, wherein:
the signal instructs the first vehicle to display the alert on a human-machine interface.

12. A processor for detecting a cargo, the processor configured to:
obtain a set of data including first data of a cargo of a first vehicle captured at a first time, wherein each of the set of data represents a different view of the cargo;
obtain second data of the cargo captured by a second vehicle in an environment of the first vehicle at a second time after the first time;
determine a first distance between two key points of the first data;
determine a second distance between two key points of the second data;
determine whether the second data corresponds to the first data of the set of data; and
in response to determining that the second data corresponds to the first data of the set of data, compare the first distance and the second distance; and
detect a movement of the cargo based on the comparison of the first distance and the second distance,
wherein the set of data, the first data, and the second data each comprise at least one of image data captured by a camera and point data captured by at least one of a LIDAR sensor, radar sensor, and/or sonar sensor.

13. The processor according to claim 12, further configured to:
transmit a signal related to an alert based on the detection of the movement of the cargo.

14. The processor according to claim 12, further configured to:
implement pose estimation on the first data to obtain the two key points of the first data; and
implement pose estimation on the second data to obtain the two key points of the second data.

15. The processor according to claim 12, further configured to:
in response to determining that the second data do not correspond to the first data of the set of data:
identify from the set of data a third data that corresponds to the second data;
determine a third distance between two key points of the third data; and
detect the movement of the cargo based on a comparison of the third distance and the second distance,
wherein the third data comprises at least one of image data captured by camera and point data captured by at least one of a LIDAR sensor, radar sensor, and/or sonar sensor.

16. The processor according to claim 12, wherein:
the first time is before the first vehicle starts to drive with the cargo.

17. The processor according to claim 12, wherein:
the second time is after the first vehicle starts to drive with the cargo.

18. The processor according to claim 12, wherein:
the key points include one or more points corresponding to a contour of the cargo.

\* \* \* \* \*